United States Patent
Ritter et al.

(10) Patent No.: US 6,696,973 B1
(45) Date of Patent: Feb. 24, 2004

(54) COMMUNICATIONS SYSTEM AND CONTROL UNIT SUITABLE THEREFOR

(75) Inventors: Rudolf Ritter, Zollikofen (CH); Eric Lauper, Bern (CH)

(73) Assignee: Swisscom Mobile AG, Bern (CH)

( * ) Notice: Subject to any disclaimer, the term of this patent is extended or adjusted under 35 U.S.C. 154(b) by 0 days.

(21) Appl. No.: 10/169,722

(22) PCT Filed: Jan. 14, 2000

(86) PCT No.: PCT/CH00/00023

§ 371 (c)(1),
(2), (4) Date: Jul. 15, 2002

(87) PCT Pub. No.: WO01/52480

PCT Pub. Date: Jul. 19, 2001

(51) Int. Cl.⁷ .............................................. G08C 19/00
(52) U.S. Cl. ............................... 340/825.72; 340/10.1; 340/539.1; 709/250; 455/403; 455/41.2; 455/88
(58) Field of Search ........................... 340/825.72, 10.1, 340/10.5, 10.51, 10.52, 7.21, 7.24, 539.1; 709/250; 455/403, 41.2, 41.3, 88, 553.1, 95, 100, 103, 73, 130, 132, 133, 344, 345, 346

(56) References Cited

U.S. PATENT DOCUMENTS

| | | | | |
|---|---|---|---|---|
| 5,197,065 A | * | 3/1993 | Calvignac et al. | 370/378 |
| 5,802,454 A | * | 9/1998 | Goshay et al. | 340/7.25 |
| 5,864,481 A | | 1/1999 | Billimoria et al. | |
| 6,356,437 B1 | * | 3/2002 | Mitchell et al. | 361/683 |
| 6,574,672 B1 | * | 6/2003 | Mitchell et al. | 709/250 |

FOREIGN PATENT DOCUMENTS

| | | |
|---|---|---|
| EP | 0 767 417 | 4/1997 |
| EP | 0 809 172 | 11/1997 |

OTHER PUBLICATIONS

J. Haartsen et al.: "Bluetooth: vision, goals, and architecture" Mobile Computing and Communication Review, vol. 2, No. 4, pp. 38–45 Oct. 1, 1998.

J. Haartesen: "Bluetooth—the universal radio interface for ad hoc, wireless connectivity" Ericsson Review, No. 3, pp. 110–117 1998.

"Jini technology and emerging network technologies" Sun Microsystems, 'Online, pp. 1–3, 1999 <URL:http://www.sun.com/jini/whitepapers/technologies.pdf> Retrieved on Sep. 15, 2000.

"Wearable computers get real" Test and Measurement World, vol. 18, No. 12, pp. 15–17 Oct. 15, 1998.

\* cited by examiner

*Primary Examiner*—Nina Tong
(74) *Attorney, Agent, or Firm*—Oblon, Spivak, McClelland, Maier & Neustadt, P.C.

(57) ABSTRACT

A communication system, in particular a mobile communication system that can to be carried by a user without using hands, which includes a control unit as well as one or more signal receiving modules and signal emitting modules that each have a radio device interface. The control unit includes a registration device to automatically register, or respectively deregister, modules dynamically added to, or respectively removed from, the communication system by the user. Data can be received in the control unit from the modules by the radio device interface, or respectively transmitted selectively to the modules by the radio device interface, it being possible to configure from which signal receiving modules data is supposed to be conducted to which signal emitting modules. The control unit also includes configurable functional units that process data before their transmission to a signal emitting module, as well as a command unit that examines data from signal receiving modules for commands contained therein, in particular user commands, and executes predefined function blocks in accordance with a recognized command.

23 Claims, 1 Drawing Sheet

COMMUNICATIONS SYSTEM AND CONTROL UNIT SUITABLE THEREFOR

TECHNICAL FIELD OF THE INVENTION

The present invention relates to a communication system and a control unit suitable therefor. In particular the present invention relates to a communication system and a control unit suitable therefor which are able to be carried by the user without using his hands, the communication system comprising one or more signal receiving modules, which each receive signals from the vicinity of the communication system and convert them into electrical, or respectively optical signals and/or digital data, and the communication system comprising one or more signal emitting modules which are each able to convert electrical, or respectively optical signals and/or digital data into signals which are perceived by the user through his sense organs or are emitted into the surroundings of the communication system.

Communication systems which are able to be carried by a user, without using his hands, are already available. There are, for example, hand-free portable communication systems comprising a mobile radio telephone removably attached to a carrying belt and connectible via a cable interface to a combined headphone/microphone set. In this example of an available communication system, the microphone and the radio receiver of the mobile radio telephone represent signal receiving modules that receive acoustical signals, or respectively radio signals, from the surroundings of the communication system, while the headphones and the radio transmitter of the mobile radio telephone represent signal emitting modules which emit acoustical signals to the sense organs of the user, or respectively radio signals to the surroundings of the communication system.

BACKGROUND OF THE INVENTION

Described in the patent application DE 197 55 264 A1 is a portable computer system able to be controlled by the user through spoken language and/or body movements. The computer system according to DE 197 55 264 A1 comprises a helmet-mounted display device which is connected via a fiber optics cable to a processing computer and/or to other actuation and signal emitting components. According to the teaching disclosed in DE 197 55 264 A1, a remotely located computer with helmet-oriented components can be connected via a radio link. The linking described in DE 197 55 264 A1 of components of the computer system by means of fiber optics cable(s) has the advantage that it is particularly secure with respect to magnetic and electrostatic interference. Furthermore cable connections for the linking of the system components carried by the user is often perceived by users as uncomfortable or even annoying, for example because cables can get tangled up in clothing or other objects. Several cables are needed for connection of a plurality of components, which further increases the cited drawback.

Described in the patent application EP 767 417 A1 is a hands-free portable and hands-free operable computer system, which can be controlled by the user through spoken language, brain waves, eye and/or body movements. The computer system according to EP 767 417 A1 consists essentially of a headset and a local computer attached to a carrying belt, which computer is connected, without cables, to the headset via a wireless interface, in particular an infrared interface. Described in the patent application EP 767 417 A1is that, for communication with a remotely located computer, connections between the local computer and the remote computer can be achieved by means of radio transceiver or cellular mobile radio telephone. The connection described in EP 767 417 A1between the headset and the local computer using scattered infrared light has the advantage of not having the drawbacks of cable-oriented connections and of being rather secure with respect to unauthorized attempts to listen in remotely. On the other hand, infrared interfaces have the disadvantage that they require an unobstructed transmission field between the communication partners, so that the local computer cannot be worn under clothing impermeable to light, for instance, which is once again perceived by users as a restrictive drawback.

In the documents XP-000784002, Haartsen J. et al.: "Bluetooth: Vision, Goals and Architecture," Mobile Computing and Communications Review, US, ACM, New York, volume 2, number 4, 1998, pages 38 to 45, and XP-000783249, Haartsen J.: "Bluetooth—The universal radio interface for ad hoc, wireless connectivity", Ericsson Review, SE, Ericsson, Stockholm, number 3, 1998, pages 110 to 117, the so-called Bluetooth radio interface is described. The Bluetooth radio interface makes it possible to interconnect portable electronic devices such as laptop computers, mobile radio telephones, headphones/speech accessories or computer mouses over short distances for wireless data communication. By means of the Bluetooth technology, the devices are automatically and dynamically interconnected when they are located within their mutual range. By means of Bluetooth technology, up to maximally eight devices, a master and seven slaves can be interconnected in a so-called Piconet. In Bluetooth a device can belong to a plurality of Piconets at the same time in the role of a slave, but be active in only one Piconet at a particular point in time.

In the document XP-002141075, "Jini Technology and Emerging Network Technologies," Sun Microsystems, online (http://www.sun.com.jini/whitepapers/technologies.pdf) 1999, pages 1 to 3, the Jini technology based on Java is described, which makes possible the development of service applications between two electronic devices such as Personal Data Assistants (PDA), television devices, digital cameras, fax machines or mobile radio telephones via network protocols such as Bluetooth (Java and Jini are registered trademarks of the company Sun Microsystems).

It is an object of this invention to propose a new and better portable, hands-free communication system and a portable, hands-free control unit suitable therefor, which make possible in particular a flexible configuration of signal receiving modules and signal emitting modules as components of the communication system as well as a cable-free connection of these components.

SUMMARY OF THE INVENTION

This object is achieved according to the invention through the elements of the independent claims. Further advantageous embodiments follow moreover from the dependent claims and from the description.

These goals are achieved through the present invention in that signal receiving modules of the hands-free portable communication system which each receive signals from the surroundings of the communication system and convert them into electrical and/or optical signals and/or into digital data, and signal emitting modules of the communication system which each convert electrical and/or optical signals and/or digital data into signals, able to be perceived by the user via his sense organs or emitted into the surroundings of the communication system, each have a radio device interface, and the communication system comprises at least one control unit with at least one radio device interface, which control unit is set up such that data from the said modules, i.e. from the signal receiving modules and the signal emitting modules, is able to be received in the control unit via the radio device interface, data from the control unit is able to be transmitted to the said modules via the radio device interface in a selective way, and said modules are able to be added to the communication system and removed from the communication system in a dynamic way. To achieve the aforementioned feature, the control unit comprises register means to register, or respectively unregister, automatically said modules which are added to, or respectively removed from, the communication system dynamically by the user. The advantage of the connection of signal receiving modules and signal emitting modules via a radio device interface with a control unit comprising automatic registration means for dynamic registration of said modules is that these components (modules and control unit) are able to be combined contactlessly, without use of cables and without needed unobstructed optical contact, into a flexibly configurable communication system, this communication system also being in particular mobile, and able to be used in a mobile way. The flexibility consists thereby in that modules, in particular mobile and portable modules, each have a radio device interface, are able to be added to, or respectively removed from, the communication system dynamically by the user without further effort or expenditure, depending upon which functionality of the communication system the user desires at the particular point in time, or respectively which modules the user has available. Components (modules and control unit) that are not integrated into a headset can be carried by the user in carrying belts suitable therefor, for example, over or under clothing or in one or more existing pockets in the clothing and can be used in particular in a mobile way, special designs, for instance a control unit in the form of a wristwatch, or signal receiving modules to be carried on predefined parts of the body, which register e.g. bodily movements/positions, are also possible, however. The selective transmission of data by the control unit via the radio device interface to the said modules facilitates data being able to be transmitted in a targeted way to a specific module, to a group of specific modules or to all modules of the communication system.

Cited here, in a non-exhaustive way, as examples of possible signal receiving modules should be video sensors for receiving light signals, radio receivers for receiving radio signals, for instance radio signals of mobile radio networks, in particular GSM and/or UMTS networks, and/or of broadcast systems, in particular DAB and/or DVB systems, infrared receivers for receiving infrared signals, microphones for receiving acoustical signals, pressure sensors for receiving mechanical pressure, eye position determining units for determining the current direction of view of at least one eye of the user and body part position determining units for determining the current position of parts of the body of the user.

Cited here, in a non-exhaustive way, as examples of possible signal emitting modules should be display units for visible reproduction of information for the user, electroacoustical converters for reproduction of information in audible form for the user, vibration units for indicating predefined events for the user by means of mechanical vibrations, radio transmitters, for instance radio transmitters for communication via mobile radio networks, in particular GSM and/or UMTS networks, and infrared transmitters.

It should also be stated here that certain signal receiving modules and signal emitting modules can be combined, for instance a microphone, headphones and a display unit, or a display unit and an eye position determining unit, or a radio transmitter and a radio receiver, or a video sensor and a display unit, also in a joint device configuration, e.g. in a headset, it being possible to provide for a common radio device interface and/or a common energy storage unit in the device configuration, for example.

According to the invention the control unit comprises means, for example a processor and a memory for programs and data, with program unit executable on the processor stored therein, of forwarding data, received by the control unit from a particular signal receiving module, to a signal emitting module assigned to the particular signal receiving module, the control unit being set up such that selection of at least certain signal receiving modules and the assigning of at least certain signal emitting modules to certain signal receiving modules can be configured by the user. The advantage of user-determinable assignment of signal receiving modules to signal emitting modules and the forwarding of data, which have been received, for example, by the signal receiving module in accordance with this configuration via the radio device interface is that separate modules can be interconnected for co-operation in a flexible way by the user (or according to stored preferred values). Thus data received by a signal receiving module, for instance a radio receiver of a mobile radio telephone, can be forwarded via the radio device interface and the control unit contactlessly to a signal emitting module, for example, depending upon the type of data, audio data to headphones and/or textual data to a display unit.

In a preferred embodiment variant, the control unit comprises functional units for processing data before their transmission to a signal emitting module, the activation, deactivation and/or way of functioning of at least certain functional units being able to be configured by the user. The processing of data by functional units prior to forwarding to a signal emitting modules makes possible almost unlimited possibilities, in particular modules being able to be interconnected for co-operation relating to different data types or respectively signal types.

Cited here, in a non-exhaustive way, as examples of possible functional units should be speech synthesis units for generating synthetic speech from textual data, speech recognition units for recognizing spoken text, image processing units for recognition of picture objects, user-specific data filters, signal frequency filters and/or signal frequency transformation units which shift the frequency spectrum of signals, or respectively of data corresponding to these signals.

In a preferred embodiment variant, the control unit comprises a command unit in order to recognize data which are received by the control unit from the signal receiving module, to recognize them as commands and to initiate the execution of predefined function blocks in accordance with a recognized command, the control unit being set up such that signal receiving modules whose data is supposed to be examined by the command unit for commands contained therein are definable by the user. The advantage of the command unit which analyzes the data of signal receiving modules and can recognize commands contained therein, in particular user commands, is that, depending upon the signal receiving modules available, different (user-) interfaces can be made accessible, suitable signal receiving modules which the user wants to use for entry of commands being able to be selected by the user. For example, by means of a speech recognition module, the command unit can recognize commands which are spoken into a microphone, or the command unit can recognize commands on the basis of current directions of view which have been received in the control unit from an eye position determining unit, or the command unit can recognize commands which are entered by a signal receiving module manually by means of operating elements, or the command unit can recognize commands on the basis of current positions of particular parts of the body of the user which are received in the control unit from a body part position determining unit.

In an embodiment variant, one of the functional blocks is designed in such a way that a recognized command is forwarded to external units outside the communication system via the radio device interface and/or via an infrared interface, the communication system being able to be used also outside the communication system, for instance for control of correspondingly equipped external units.

In an embodiment variant, the communication system comprises a removable storage unit, for example a chipcard, in which module parameters are stored, which influence the operation of individual said modules, and/or configuration parameters, which determine the interaction between said modules and/or identify signal receiving modules whose data is supposed to be examined by the command unit for commands contained therein. These module parameters and configuration parameters can be stored as alternatives or in addition also in a permanent data store of the communication system, in particular in the control unit. The removable storage unit can be furthermore provided with means for unambiguous user identification, for example the removable memory unit can be designed as an identification unit with an unambiguous user identification, in particular as SIM card (Subscriber Identification Module). The identification unit can be a component of a mobile radio telephone, for example, which, as a combined signal receiving and signal emitting module, is connected to the control unit via the radio device interface, or the identification unit can be a component of the control unit. The advantage of the identification unit is that it makes possible configuration and use of the portable communication system as a personal communication system, without using one's hands, user-specific parameters, in particular module parameters, which influence the operation of individual said modules, and/or configuration parameters, which determine the interaction between two or more said modules, being stored in the identification unit.

In an embodiment variant, at least certain of the said modules data stores for storing the above-mentioned module parameters, which influence the operation of the respective module, these data stores being accessible to the control unit in a secure way via the radio device interface, so that module parameters cannot be set by other, external radio units outside the communication system by accident or in an unauthorized way. The module parameters can be entered, for example, by the user via a user interface made available therefor, or can be received from a suitable external service unit outside the communication system by means of a radio receiver, for instance via a mobile radio network, and transmitted from the control unit to the respective module.

In an embodiment variant, the above-mentioned video sensor comprises at least one microelectromechanical (MEM) scanner for registering light signals. The advantage of microelectromechanical scanners is, among other things, that they can also be used for direct projection of light signals onto the retina. Thus the above-mentioned display unit comprises, in an embodiment variant, a virtual retinal display unit, based on at least one microelectromechanical scanner, which projects lights signals directly on the retina of the user.

In an embodiment variant, the communication system comprises at least one signal transformation module in which signal transformation module a signal receiving module and a signal emitting module are linked together via a signal processing unit, the signal processing unit processing electrical and/or optical signals from the aforementioned signal receiving unit based on module parameters of the signal transformation module and forwarding them to the aforementioned signal emitting module. Cited here, in a non-exhaustive way, as examples of signal transformation modules and their module parameters should be hearing aids and their user-specific hearing parameters as well as special seeing aids, for example night vision devices which transform light signals from the infrared range into visible light signals and their user-specific seeing parameters.

It should be mentioned here that, besides the communication system according to the invention, the present invention also relates to a control unit for achieving this communication system.

BRIEF DESCRIPTION OF THE DRAWINGS

An embodiment of the present invention will be described in the following with reference to examples. The examples of the embodiment are illustrated by the following single attached figure.

DETAILED DESCRIPTION OF THE INVENTION

Figure 1:
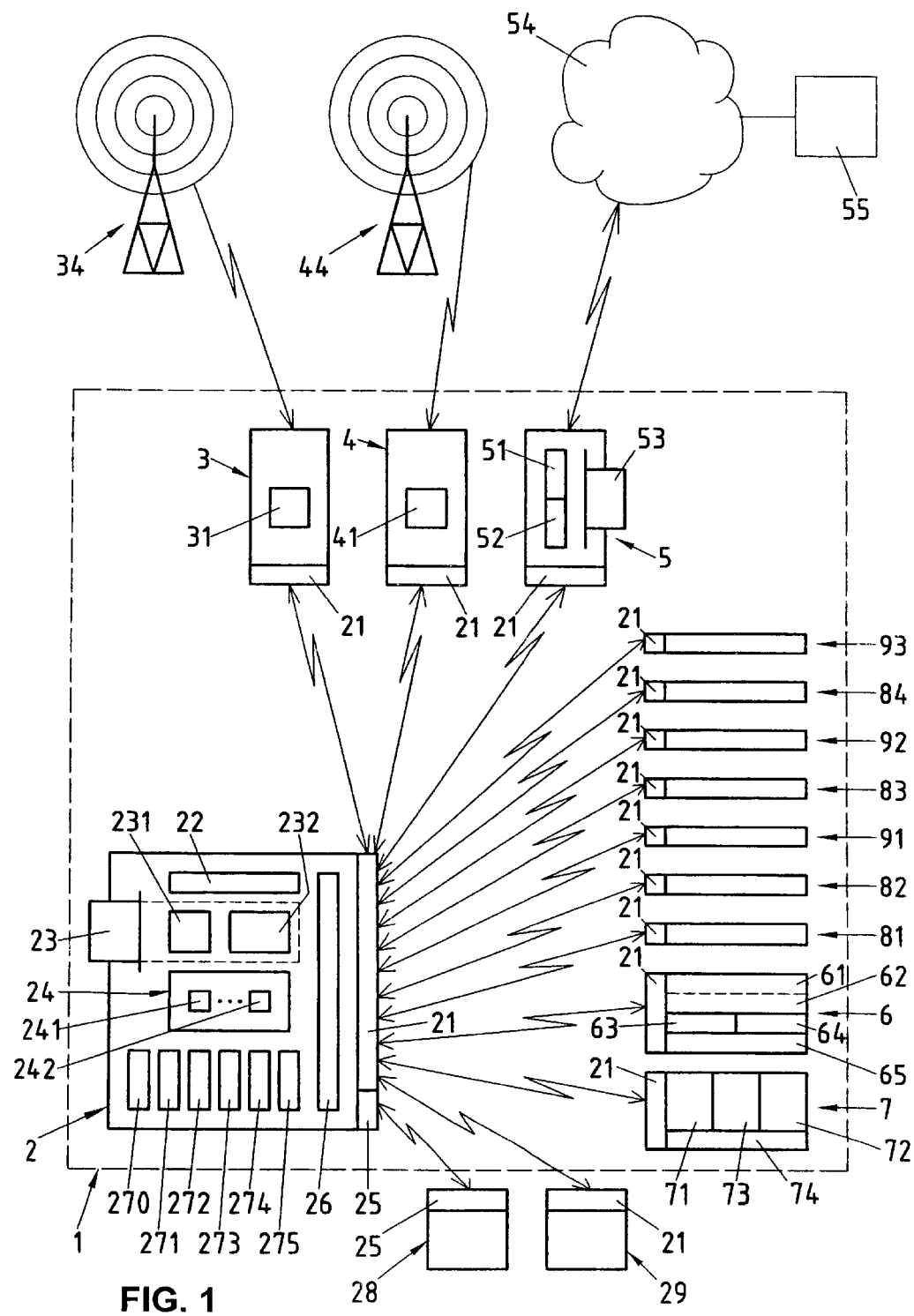
FIG. 1 shows a block diagram in which a communication system is shown schematically with a control unit, with signal receiving and signal emitting modules as well as external units outside the communication system.

In FIG. 1, the reference numeral 1 refers to a mobile and hands-free portable communication system comprising a control unit 2 as well as a plurality of signal receiving modules 3, 4, 51, 61, 65, 71, 81, 82, 83, 84 and a plurality of signal emitting modules 52, 62, 72, 91, 92, 93. Designated as signal receiving modules 3, 4, 51, 61, 65, 71, 81, 82, 83, 84 are modules which each receive signals from the surroundings of the communication system 1 and convert them into electrical and/or optical signals and/or digital data. Designated as signal emitting modules 52, 62, 72, 91, 92, 93 are modules which each convert electrical and/or optical signals and/or digital data into signals perceivable by the user through his organs of sense or able to be emitted into the surroundings of the communication system 1. In the following text the term module will be used as an overall, comprehensive designation for signal receiving modules and signal emitting modules.

As illustrated in FIG. 1, data can be exchanged between the modules 3, 4, 51, 61, 65, 71, 81, 82, 83, 84, 52, 62, 72, 91, 92, 93 and the control unit 2 via a contactless radio device interface 21. Although the data exchange can take place in principle bidirectionally, it is absolutely possible to design certain of the modules for a unidirectional data exchange only, for example simply equipped signal emitting modules can be designed only with just a radio receiver for receiving data from the control unit 2 via the radio device interface 21, or simply equipped signal receiving modules can be designed with just a radio transmitter for transmission of data to the control unit 2 via the radio device interface 21. Signal receiving modules and signal emitting modules can also be combined into a common device, for example radio receivers 51 and radio transmitters 52 for mobile radio networks 54, for instance a GSM or UMTS network or another, e.g. satellite-based, mobile radio network, into a mobile radio device 5, in particular a mobile radio telephone. Signal receiving modules and signal emitting modules which are combined into a joint device can have a common radio device interface 21 or a common power supply device. Feed units for signal receiving and signal emitting modules comprise, for instance, conventional batteries and/or solar cells, and can be put into the ready state selectively from a switched-on energy-saving ready state, or respectively from the switched-on state, by the control unit 2 with predefined commands via the radio device interface 21, for instance. Although this is not shown in FIG. 1, the control unit 2 can also be designed such that certain of the signal receiving and/or signal emitting modules are integrated into the control unit 2 such that the radio device interface 21 is superfluous for these direct integrated modules.

The radio device interface 21 is preferably a standardized radio device interface, for example a high-frequency radio interface, in particular a so-called Bluetooth interface, which e.g. operates at 2.4 GHz and was described at the time of filing of this application on the Internet on page www.bluetooth.com, for example. The radio device interface 21 shown symbolically in FIG. 1 (as well as also the infrared interface 25) each comprise the necessary hardware and software components for achieving the various levels for the respective radio device interface (or respectively infrared interface) according to the OSI reference module (Open Systems Interconnection) specified by the ISO (International Standards Organization). Depending upon the type and/or transmitting capacity of the respective radio device interface it can also be advantageous to design the control unit with a plurality of radio device interfaces, for instance separate radio device interfaces for separate left and right channels of particular signal emitting modules, for example display units for the left and right eye of the user or electro-acoustical converters for the left and right ear of the user.

A user, who is equipped with a control unit 2, can flexibly configure his personal communication system 1 in that he adds devices, each comprising one or more signal receiving and/or signal emitting modules, dynamically to the communication system 1, or respectively removes them from the communication system 1. The hands-free portable control unit 2 is carried by the user on his body, for instance in a carrying belt, in a pocket of his clothing or with suitable fastening means to a part of the body, for instance on the wrist in the form of a wristwatch. An additional module is added to the communication system 1 in that it is carried by the user, as described for the control unit 2, and in that the registration unit 22 is registered by registration means of the control unit 2. The control unit 2 comprises, depending upon the embodiment, at least one processor and a memory, accessible to this processor, for storing data and program units which are necessary for execution of the different functions of the control unit 2. Functional units and blocks, which are achieved as program units, can also be achieved, as a rule, through hardware. As an alternative to the embodiment of the control unit 2 as self-sufficient device with housing, power supply and, if applicable, with own operating elements and display unit, the control unit 2 can also be built into other devices, in particular into other mobile devices, for instance into a mobile radio telephone.

The registration unit 22 is, for example, a programmed unit which is stored in a memory of the control unit 2 and is executed on a processor of the control unit 2. In particular modules, which have a bidirectional radio device interface 21, can be registered by the control unit 2 automatically. The registration process of the registration unit 22 can be initiated by the user, for example through a command from the user, automatically when switching on the control unit 2 and/or periodically through the registration unit 22. If necessary, the registration unit 22 can also make use of services and/or information of the radio device interface 21 to verify and/or register the presence of signal receiving and/or signal emitting modules. With suitable messages, which are transmitted by the control unit 2 via the radio device interface 21, modules can be asked to identify themselves via the radio device interface 21. Already registered modules can be asked by the control unit 2 via the radio device interface 21 to confirm their presence; this can be achieved, for example, when switching on the control unit and/or periodically and/or module specifically. The registration process, in another embodiment variant, can also be initiated by the modules in that these report their presence to the control unit 2 via the radio device interface, without being asked to, for instance upon switching on the respective module and/or periodically. To prevent an erroneous registration of modules not carried by the user, it can be provided for that the registration has to be confirmed by the user. The dialogue between the user and the control unit 2, in particular for basic operations, such as the registration of additional modules, can be carried out e.g. by means of simple operating elements (not shown), for example press buttons, and a simple display (not shown), for instance an LCD display, of the control unit 2. As a rule, the dialogue between the user and the control unit 2 can also be carried out via suitable signal receiving and signal emitting modules, however, as will be explained later in connection with the command unit 24 of the control unit 2.

The modules of the communication system 1 are registered in a module table 231 by the registration unit 22. Depending upon the radio device interface 21 used, a temporary module identification, unambiguous within the communication system 1 is registered and/or a permanent unambiguous module identification, for instance an unambiguous device number. Further module-specific data can also be transmitted to the registration unit 22 during registration and entered in the module table 231. Module-specific data for common module types can already be stored in the control unit, and determined by the registration unit 22 on the basis of a module type received from a module and entered in the module table 231 for the respective module. Module-specific data can also be entered by the user and registered in the module table 231 by the registration unit 22. Cited here, in an non-exhaustive way, as examples of module-specific data should be the functional type(s) of the module, supported data types, file formats and compression method of the module as well as configurable parameters of the module, it being possible to influence the operation of the respective module through the configurable module parameter. Status information for the module of the communication system 1 can also be administered by the control unit 2 in the module table 231.

Data which are received in the control unit 2 via the radio device interface 21, via the infrared interface 25 or from signal receiving modules integrated into the control unit 2, for example the above-mentioned operating elements (not shown) or the infrared transmitter/receiver 25, are conducted to a routing unit 26. The routing unit 26 forwards directly to the registration unit 22, for further processing, register reports, unrequested and/or requested by the control unit, which are recognizable e.g. on the basis of a special data header. Data received from signal receiving modules are handled by the routing unit 26 according to indications in the configuration table 232 of the control unit 2.

The configuration table 232 contains configuration parameters which determine in particular the interaction between the registered modules of the communication system 1 and can be set by the user. By means of the configuration parameters in the configuration table 232, the flow of signals, or respectively the flow of data corresponding to these signals, which are received from the signal receiving modules and transmitted to the control unit 2, in particular to suitable signal emitting modules, can be configured flexibly by the user. Moreover functional units 270–275 can be specified by the user in which the data corresponding to the signals are processed before they are conducted from the control unit 2 to the specified signal emitting module(s). The user can also specify function parameters moreover which determine the way of functioning of the functional unit(s). The function parameters can either be stored directly in the configuration table 232, or the configuration table 232 can also contain just a mere pointer to the function parameters stored in a separate table. Essentially the configuration table 232 contains an identification of the data/signal source (signal receiving module), one or more identifications of data/signal sink (in particular signal emitting modules), one or more identifications of functional units 270–275 as well as functional parameters relating thereto.

The user can also specify the above-mentioned command unit 24 as special data/signal sink in the configuration table 232, whereby in this case too functional units 270–275 as well as functional parameters related thereto can be specified so that data can be processed in the specified functional units based on the specified functional parameters prior to being transmitted to the command unit 24.

The command unit 24 examines data which have been received by the control unit 2 from signal receiving modules and have been conducted from the routing unit 26 to the command unit 24 according to the configuration table 232 as to whether these data contain commands, in particular user commands. If the command unit 24 recognizes such a command, it initiates the execution of a function block 241–242 assigned to this command. The function blocks 241–242 as well as their assignment to commands can also be designed in a configurable way, for example memory units with predefined function blocks 241–242 and assignments to commands can be acquired by the user and be introduced into the control unit or loaded, or macro-programming tools suitable therefor can be made available to the user.

The user can also specify data stores as further special data/signal sink in the configuration table 232 when the data received from a signal receiving module are supposed to be saved.

Cited here, in a non-exhaustive way, as examples of functional units 270–275 should be a speech synthesis unit 270 for generating synthetic speech from textual data, a speech recognition unit 271 for recognizing spoken text, in digital form, an image processing unit 272 for recognizing picture objects for digital image data, data filters 273 for filtering digital data values, for example according to pre-defined user profiles, signal frequency filters 274, in particular digital filters, and/or signal frequency transformation units 275. The functional units 270–275 are designed, for example, as program units which are stored in the control unit and are executed on a processor of the control unit 2, in particular a signal processing processor.

As indicated in FIG. 1, the configuration table 232 and the module table 231 can be stored on a removable memory unit 23, for example a chipcard. The removable memory unit can also be provided with means for unambiguous user identification, for instance the removable memory unit can be designed as an identification unit with an unambiguous user identification, for example as an SIM card (Subscriber Identification Module), which can also be used for identification of the user in mobile radio networks. The configuration table 232 and the module table 231 can also be stored in a fixed-installed memory in the control unit, however, and be loaded from an SIM card 53 of a mobile radio device 5, for instance a mobile radio telephone, via the radio device interface 21 in the control unit 2. Different sets of predefined configuration tables 232 and module tables 231 can also be loaded into the control unit 2 from a service unit 55, via a mobile radio network 54, a mobile radio device 5 and the device radio interface 21. The user can also insert various memory units 23 with different configuration tables 232 and module tables 231 directly into the control unit 2.

Cited here, in a non-exhaustive way, as examples of possible signal receiving modules should be video sensors 61, 84 for receiving light signals, radio receivers 3, 4, 51 for receiving radio signals, for instance a radio receiver 51 for receiving radio signals of mobile radio networks 54, in particular GSM and/or UMTS networks, and/or radio signals, in particular radio signals with digital program-accompanying data, of broadcast systems, for example a DAB-radio receiver 3 (Digital Audio Broadcasting) for receiving radio signals form a DAB transmitter 34 and/or a DVB radio receiver 4 (Digital Video Broadcasting) for receiving radio signals from a DVB radio transmitter 44, infrared receiver 25 for receiving infrared signals, microphones 71, 83 for receiving acoustical signals, pressure sensors 82 for receiving mechanical pressure, eye position determining units 65 for determining the current direction of view of at least one eye of the user and body position determining units 81 for determining the current position of body parts of the user. Indicated here as further examples of signal receiving modules should also be, for instance, position determining modules, e.g. position determining modules based on the Global Positioning System (GPS) or on a terrestrial positioning system (TPS), which position determining modules receive signals from the surroundings of the communication system1 and determine therefrom position indications which are transmitted e.g. to the control unit 2. If the communication system 1 is not supposed to be used just in a mobile way, signal receiving modules can also be employed which are connected to fixed networks, for example the public switched telephone network or an ISDN network via interfaces having contacts or contactless interfaces, or to fixed-installed devices.

Cited here, in a non-exhaustive way, as examples of possible signal emitting modules should be display units 62, 93 for visible reproduction of information for the user, electro-acoustical converters 72, 92 for reproduction of information in audible form for the user, vibration units 91 for indicating predefined events for the user by means of mechanical vibrations, radio transmitters 52, for instance radio transmitters for communication via mobile radio networks 54, in particular GSM- and/or UMTS networks, radio device interfaces, for example Bluetooth interfaces, and infrared transmitters 25.

To illustrate the application possibilities of the configuration table 232, possible examples are represented in Table 1 based on the above-mentioned examples of signal receiving modules, signal emitting modules and functional units.

The entry designated by a) in Table 1 illustrates the configuration of the communication system 1 for the entry of speech-controlled commands via a microphone 83.

The entry designated by b) in Table 1 illustrates the configuration of the communication system 1 for the entry of commands by means of eye positions, which are captured by the eye position determining unit 65, current eye positions being compared in the command unit 24 with predefined eye positions.

The entry designated by c) in Table 1 illustrates the configuration of the communication system 1 for the entry of commands by means of bodily movements which are captured by the body position determining unit 81. Cited here as examples of body position determining units 81 should be in particular body position determining units for fingers, hands, legs, arms and head, which are known, for example, from the various areas of application of virtual reality.

TABLE 1

| | Signal/Data Source | Functional Unit | Function Parameter | Signal/Data Sink | ... |
|---|---|---|---|---|---|
| a) | microphone 83 | speech recognition unit 271 | user-specific speech parameter | command unit 24 | ... |
| b) | eye position determining unit 65 | | | command unit 24 | ... |
| c) | body position determining unit 81 | | | command unit 24 | ... |
| d) | DAB-radio-receiver 3 | data filter 273 | user profile | electro-acoustical converter 92 | ... |
| e) | DVB-radio-receiver 4 | data filter 273 | user profile | display unit 93 | ... |
| f) | Video sensor 84 | picture processing unit 272 speech synthesis unit 270 | picture object list | electro-acoustical converter 92 | ... |
| g) | Video sensor | signal frequency transformation unit 275 | transformation parameter | display unit 93 | ... |

The entry designated by d) in Table 1 illustrates the forwarding of radio programs, received by the DAB radio receiver 3, to the electro-acoustical converter 92, for instance headphones, program-accompanying data being filtered through the data filter 273, for instance according to user-specific areas of interest, specified in a user profile.

The entry designated by e) in Table 1 illustrates the forwarding of video programs, received by the DVB radio receiver 4, to the display unit 93, for instance a LCD display or a virtual retinal display unit, program-accompanying data being filtered through the data filter 273, for instance according to user-specific areas of interest, specified in a user profile.

The entry designated by f) in Table 1 illustrates the configuration of the communication system 1 as a seeing aid through the processing of image data, received by the video sensor 84, in the image processing unit 272 (which generates, for example, designations in text form for recognized picture objects) and the further processing of generated text data in the speech synthesis unit 270, which generates synthetic speech signals which are forwarded to the electro-acoustical converter 92.

The entry designated by g) in Table 1 illustrates the configuration of the communication system 1 as a seeing aid through the processing of image data, received by the video sensor 84, in the signal frequency transformation unit 275, in accordance with transformation parameters, corresponding, for instance, to the transformation of infrared light into light signals visible to the user, and the reproduction of the transformed image data to the display unit 93.

Table 1 illustrates only a small number of possible configurations which are possible in the communication system 1 according to the invention. Specific configurations, which are defined in the configuration table 232, can be activated e.g. via the command unit in that, for instance, one of the function blocks 241–242 is designed in such a way that it activates an entry indicated in a command (e.g. command activation-d), which is useful particularly if the configuration table 232 comprises a multiplicity of entries which in part contradict one another (otherwise, in the case of contradictory entries, the first of the contradictory entries is activated by default, for instance).

Through corresponding entries in the configuration table 232 and/or corresponding function blocks 241–242, data, in particular commands, can also be transmitted by the control unit 2 to external (not registered) units 28, 29 outside the communication system 1, or respectively data received from these external units 28, 29 and e.g. displayed to the user. It can also be provided for that external units 28, 29 are registered at least temporarily in the control unit 2. The control unit 2 of the communication system 1 thus makes possible the interaction with external units 28, 29, for example household appliances, entertainment devices, automatic banking machines, access control installations, and/or automatic sales devices as well as other user-controllable devices, for example transport devices such as wheelchairs or automobiles which thus can be operated by the user, for example language-controlled, via the radio device interface 21 or the infrared interface 25.

In the communication system 1, signal receiving modules and signal emitting modules, comprising data stores 31, 41, 64, 74 (plus data stores on the identification unit 53) with module-specific parameters, which module parameters determine the operation of he respective module, are configured by the control unit 2, in that such module parameters are transmitted by the control unit 2 via the radio device interface 21 to respective modules (the module parameters can also be read in these data stores by the control unit 2). The transmission preferably takes place in a secured way so that the module parameters cannot be changed by an external transmitter in an unauthorized way or by accident. Cited here, in a non-exhaustive way, as examples of such module parameters should be user-specific hearing parameters for hearing aids 7, user-specific sight parameters for viewing devices 6, user-specific data on the identification unit 53, or user profiles for filtering program-accompanying data in the broadcast receivers 3, 4.

One or more signal receiving modules and one or more signal emitting modules can be connected in a so-called signal transformation module via a signal processing unit, the signal processing unit processing electrical and/or optical signals from the aforementioned signal receiving module, for example on the basis of module parameters stored in the signal transformation module, and forwarding them to the aforementioned signal emitting module. Cited here, in a non-exhaustive way, as examples of signal transformation modules should be the above-mentioned hearing aid 7 as well as the above-mentioned viewing device 6.

The viewing device 6 comprises a virtual retinal display unit 62, which makes pictures visible to the user of the viewing device 6, in that it projects corresponding picture signals onto the retina of the eye of the user. The picture data for the pictures are taken by suitable video sensors 61, for example by a video camera or by suitable optical elements 61 using the virtual retinal display device 62 as recording picture scanner, and project the picture data corresponding to the image signals onto the retina through the virtual retinal display unit 62. The use of microelectromechanical (MEM) elements, in particular microelectromechanical scanners with a biaxial mirror, for the projection of picture signals in a direct retinal display unit and/or for receiving of light reflected or emitted by objects is described, for example, in the patent application WO 98/13720. It should be mentioned here that it is absolutely possible to alter the received picture data in a signal processing unit 63 with suitable picture processing means, for example based on user-specific sight parameters in the data store 64, before they are made visible to the user, for example contours can be emphasized, contrasts heightened or other picture processing carried out, for example a signal frequency transformation corresponding to transformation of infrared light into light visible to the user. The components of the viewing device 6 are preferably integrated into a common housing or on a common carrier, this housing or this carrier being preferably designed such that it can be put on by the user like a pair of conventional spectacles. Further components, such as a microphone and/ or headphones, respectively hearing aids, and in particular also the radio device interface 21 can likewise be installed on this common carrier.

A virtual retinal display device (VRD), which can project image signals directly onto the retina of a viewer has been described, for example, in the patent applications WO 94/09472 and WO 97/37339 and in the above-mentioned patent application WO 98/13720. Via a video data interface, these virtual retinal display devices can be supplied with video data, for example in the form of an RGB signal, an NTSC signal, a VGA signal or another formatted color or monochrome video or graphic signal. One skilled in the art will understand that it can be advantageous to adapt the virtual retinal display device described in the mentioned patent publications WO 94/09472 and WO 97/37339, or respectively the video data interface described there, in such a way that it is also able to receive efficiently other formats of picture signals, depending upon the video sensors use. By means of an interface module (not shown), received picture data can also be suitably adapted to the video interface, however, or respectively received picture data can be converted such that they are able to be applied to the video interface and made visible to the user by means of the virtual retinal display unit 62.

As is shown schematically in FIG. 1, the viewing device 6 comprises an eye position determining unit 65 which determines the current eye positions of the user when viewing pictures and can transmit them via the radio device interface 21 to the control unit 2. An eye position determining unit (eye tracker) which determines the current eye positions based on the position of the pupil of a user has also been described in the above-mentioned patent application WO 94/09472, and can be extended by one skilled in the art in such a way that the determined eye position can be transmitted via the radio device interface 21 to the control unit 2; depending upon embodiment, values for both eyes can be made available.

It should be stated here moreover that determined eye positions, for instance in the control unit 2, in addition with determined head position, or respectively head movement, which are captured e.g. by the body part position determining unit 81 with respect to the horizontal and vertical plane as horizontal and vertical head angle of rotation, can be combined in order to determine the actual direction of view of the user.

Together with the eye position determining unit 65, the seeing device 6 can be used as a graphic user interface, which can be controlled by the user through positioning his eyes in that, via the virtual retinal display device 62, the control unit 2 projects GUI objects (Graphical User Interface) in picture regions onto the retina of the user, for instance so-called control icons corresponding to predefined eye position values, and is able to receive commands entered by the user by means of eye positioning through comparison of current eye positions with predefined eye position values (in the command unit 24).

The above-mentioned hearing aid 7 comprises a microphone 71 which is connected via a signal processing unit 73 to an electro-acoustical converter 72, for example headphones. The signal processing unit 73 processes electrical signals received from the microphone 73, or respectively data corresponding to these signals, based on user-specific hearing parameters stored in the data store 74.

Although this has not been shown in FIG. 1, it should be mentioned here that the user can also communicate with other devices via the control unit 2, or respectively control these devices, which are each provided with a radio device interface, for example fixed-installed communications terminals and/or personal computers which e.g. are connected to a communication network, in particular the Internet. It is also possible for the user to access the Internet also in a mobile way via the control unit 2, for instance via WAP (Wireless Application Protocol), which is executed in the control unit 2 or in one of the modules, for instance in the mobile radio device 5.

It should be explicitly mentioned here that the control unit 2 has various program units to support file formats, data transmission protocols and compression/decompression methods, in particular from the multimedia area, for instance MPEG-Standards (Moving Picture Expert Group), and in particular also convert them mutually, so that signal emitting and signal receiving modules with differing file formats, data transmission protocols and compression/decompression methods can be connected to one another via the routing unit 26. To prevent overloads through simultaneous data input from different signal emitting modules, the control unit can also be provided with additional data buffer stores.

The communication system 1 according to the invention based on the control unit 2 according to the invention makes it possible for the user to add different components to the communication system 1, in particular different signal receiving and signal emitting modules, or respectively remove them from the communication system 1, and to connect them to one another in a configurable way via the control unit 2. The user can also configure different signal receiving modules, or respectively signal emitting modules, as input or respectively output modules for user interfaces and control the most various external devices via these user interfaces. The configuration can also take place through command input via these user interfaces. Predefined configurations can also be loaded into the control unit, for instance via the communication network or stored on data carriers. At the same time different configurations can be stored in the control unit 2 which can be activated by the user via the user interface. The control unit 2 can also be configured by the user, for example in that different processing units 270–275, different function units 241–242, different configuration tables 232, different module tables 231 and/or different command units 24 are loaded into the control unit.

Configurations which can be carried out by the user via the control unit 2 can also be carried out of course by correspondingly trained and authorized specialized personnel, for example on site at a service point or remotely via a telecommunications link.

Finally, it should be mentioned here that the communication system 1 can also comprise a plurality of control units 2, one of these control units 2 being able to be configured as coordinated master unit, and module parameters and/or configuration parameters being able to be stored in a distributed way and/or replicated on all participating control units 2.

| List of Reference Numerals | |
|---|---|
| 1 | communication system |
| 2 | control unit |
| 3 | DAB radio receiver |
| 4 | DVB radio receiver |
| 5 | mobile radio device |
| 6 | seeing device |
| 7 | hearing device |
| 21 | radio device interface |
| 22 | registration unit |
| 23 | removable memory unit |
| 24 | command unit |
| 25 | infrared transceiver |
| 26 | routing unit |
| 28, 29 | external unit |
| 31 | data store |
| 34 | DAB radio transmitter |
| 41 | data store |
| 44 | DVB radio transmitter |
| 51 | radio receiver for mobile radio networks |
| 52 | radio transmitter for mobile radio networks |
| 53 | identification unit |
| 54 | mobile radio network |
| 55 | service unit |
| 61 | video sensor |
| 62 | display unit |
| 63 | signal processing unit |
| 64 | data store |
| 65 | eye position determining unit |
| 71 | microphone |
| 72 | electro-acoustical converter |
| 73 | signal processing unit |
| 74 | data store |
| 81 | body part position determining unit |
| 82 | pressure sensor |
| 83 | microphone |
| 84 | video sensor |
| 91 | vibration unit |
| 92 | electro-acoustical converter |
| 93 | display unit |
| 231 | module table |
| 232 | configuration table |
| 241, 242 | functional block |
| 270 | speech synthesis unit |
| 271 | speech recognition unit |
| 272 | picture processing unit |
| 273 | data filter |
| 274 | signal frequency filter |
| 275 | signal frequency transformation unit |

What is claimed is:

1. A communication system configured to be carried by a user without using hands, comprising:

one or more signal receiving modules that each receive signals from surroundings of the communication system and convert received signals into digital data; and one or more signal emitting modules that each convert digital data into signals configured to be emitted into the surroundings of the communication system and at least certain of the signals are perceivable by the user through sense organs, the modules each having a device radio interface;

a control unit with a device radio interface by which radio device interface data from the modules are receivable in the control unit and by which radio device interface data are transmittable by the control unit selectively to the modules, the control unit comprising registration means to automatically register, or respectively deregister, said modules that have been dynamically added to, or respectively removed from, the communication system by the user, wherein the control unit further comprises a store in which a configuration table is stored in which selection of at least certain signal receiving modules as data sources and assignment of at least certain signal emitting modules as data sinks for certain signal receiving modules are configurable, the control unit further comprises means for forwarding data received from a particular signal receiving module according to indications in the configuration table to a signal emitting module assigned to the particular signal receiving module.

2. The communication system according to claim 1, wherein the control unit further comprises functional units to process data before transmission of the data to a signal emitting module, at least one of activation, deactivation, and way of functioning of at least certain of the functional units being configurable.

3. The communication system according to claim 2, wherein the functional units comprise a speech synthesis unit for generation of synthesized speech from textual data, a language recognition unit for recognition of spoken text, an image processing unit for recognition of picture objects, user-specific data filters, and at least one of signal frequency filters and signal frequency transformation units.

4. The communication system according to claim 1, wherein the control unit further comprises a command unit to recognize as commands data received by the control unit from a signal receiving module and to initiate execution of predefined function blocks in accordance with a recognized command, the control unit being configured such that signal receiving modules whose data is supposed to be examined by the command unit for commands contained therein are definable.

5. The communication system according to claim 4, wherein at least one of the functional blocks is configured such that a recognized command is configured to be forwarded to external units outside the communication system by at least one of the radio device interface and an infrared interface.

6. The communication system according to claim 1, further comprising a removable memory unit, and wherein at least certain of the signal emitting modules stored in the removable memory unit are at least one of module parameters, which influence operation of individual of the modules, and configuration parameters, which at least one of determine interaction between the modules and identify signal receiving modules whose data is supposed to be examined by a command unit for commands contained therein.

7. The communication system according to claim 1, wherein at least certain of the modules comprise data stores for storing module parameters, which module parameters influence operation of the respective module, the data stores being accessible to the control unit by the radio device interface.

8. The communication system according to claim 1, wherein the signal receiving modules comprise a video sensor for receiving light signals, a radio receiver for receiving radio signals, an infrared receiver for receiving infrared signals, a microphone for receiving acoustical signals, a pressure sensor for receiving mechanical pressure, and at least one of an eye position determining unit for determining a current direction of view of at least one eye of the user and one or more body part position determining units for determining a current position of parts of the body of the user.

9. The communication system according to claim 8, wherein the radio receiver is configured to receive radio signals from mobile radio networks, in particular GSM and/or UMTS networks, and/or broadcast systems, in particular DAB and/or DVB systems.

10. The communication system according to claim 8, wherein the video sensor comprises at least one microelectronic scanner for capturing light signals.

11. The communication system according to claim 1, wherein the signal emitting modules comprise a display unit for visible reproduction of information for the user, an electro-acoustical converter for reproduction of information in audible form for the user, a vibration unit display of predefined events for the user by mechanical vibrations, and at least one of a radio transmitter and an infrared transmitter.

12. The communication system according to claim 11, wherein the display unit comprises a virtual display unit to project light signals directly onto a retina of the user.

13. The communication system according to claim 12, wherein the radio transmitter is configured for communication by mobile radio networks, in particular GSM and/or UMTS networks.

14. The communication system according to claim 1, further comprising at least one signal transformation module in which a signal receiving module and a signal emitting module are connected to one another by a signal processing unit, the signal processing unit processing electrical/optical signals from the signal receiving module based on module parameters of the signal transformation module and forwarding the electrical/optical signals to the signal emitting module.

15. The communication system according to claim 14, wherein the signal transformation module includes a hearing aid and the module parameters include user-specific hearing parameters.

16. The communication system according to claim 14, wherein the signal transformation module includes a seeing aid and the module parameters include user-specific seeing parameters.

17. A control unit for a communication system, which communication system and which control unit are carried by a user without using hands, which communication system comprises one or more signal receiving modules that each receive signals from surroundings of the communication system and convert received signals into electrical/optical signals and digital data, and which communication system comprises one or more signal emitting modules that each convert digital data into signals configured to be emitted into the surroundings of the communication system and of which at least certain of the signals are perceivable by the user through sense organs, the control unit comprising at least one device radio interface, and the control unit further comprising registration means to automatically register, or respectively deregister, modules that have been dynamically added to, or respectively removed from, the communication system by the user, wherein the control unit further comprises a store in which a configuration table is stored in which selection of at least certain signal receiving modules as data sources and assignment of at least certain signal emitting modules as data sinks for certain signal receiving modules are configurable, and the control unit further comprises means for forwarding data received from a particular signal receiving modules according to indications in the configuration table to a signal emitting module assigned to the particular signal receiving module.

18. The control unit according to claim 17, further comprising functional units to process data before transmission of the data to a signal emitting module, at least one of activation, deactivation, and way of functioning of at least certain functional units being configurable.

19. The control unit according to claim 18, wherein the functional units comprise a speech synthesis unit for generating synthesized speech from textual data, a language recognition unit for recognizing spoken text, an image processing unit for recognizing picture objects, user-specific data filters, and at least one of signal frequency filters and signal frequency transformation units.

20. The control unit according to claim 17, further comprising a command unit to recognize as commands data received by the control unit from a signal receiving module and to initiate execution of predefined function blocks in accordance with a recognized command, the control unit being set up such that signal receiving modules whose data is supposed to be examined by the command unit commands contained therein are definable.

21. The control unit according to claim 20, wherein at least one of the functional blocks is configured such that a recognized command is configured to be forwarded to external units outside the communication system by at least one of the radio device interface and by an infrared interface.

22. The control unit according to claim 17, further comprising a removable memory unit configured to store at least one of module parameters, which influence operation of individual of the modules, and configuration parameters, which determine at least one of interaction between the modules and identify signal receiving modules whose data is supposed to be examined by a command unit for commands contained therein.

23. The control unit according to claim 22, wherein the removable memory unit comprises means for unambiguous user identification.

* * * * *